(12) United States Patent
Shin et al.

(10) Patent No.: US 10,082,709 B2
(45) Date of Patent: Sep. 25, 2018

(54) LIQUID CRYSTAL DISPLAY DEVICE

(71) Applicant: Samsung Display Co. Ltd., Yongin-si (KR)

(72) Inventors: Dong Chul Shin, Seoul (KR); Dong Han Song, Hwaseong-si (KR); Ki Chul Shin, Seongnam-si (KR); Ho Kil Oh, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 16 days.

(21) Appl. No.: 15/269,598

(22) Filed: Sep. 19, 2016

(65) Prior Publication Data
US 2017/0235194 A1   Aug. 17, 2017

(30) Foreign Application Priority Data

Feb. 17, 2016   (KR) .................. 10-2016-0018542

(51) Int. Cl.
*G02F 1/1337* (2006.01)
*C09K 19/02* (2006.01)
(Continued)

(52) U.S. Cl.
CPC .... *G02F 1/134309* (2013.01); *G02F 1/13439* (2013.01); *G02F 1/1337* (2013.01); *G02F 1/1368* (2013.01); *G02F 1/133345* (2013.01); *G02F 1/133512* (2013.01); *G02F 1/133514* (2013.01); *G02F 1/133707* (2013.01); *G02F 1/133753* (2013.01); *G02F 1/136286* (2013.01); *G02F 2001/133357* (2013.01); *G02F 2001/133749* (2013.01); *G02F 2001/133757* (2013.01); *G02F 2201/121* (2013.01); *G02F 2201/123* (2013.01); *G02F 2202/06* (2013.01); *G02F 2203/04* (2013.01)

(58) Field of Classification Search
CPC ......... G02F 1/133707; G02F 1/133753; G02F 2001/133757
USPC ....................................... 349/129
See application file for complete search history.

(56) References Cited

U.S. PATENT DOCUMENTS 6,593,987 B1 * 7/2003 Walton .............. G02F 1/133753
349/129
8,304,039 B2   11/2012 Oh et al.
(Continued)

FOREIGN PATENT DOCUMENTS

KR   101358328   1/2014

*Primary Examiner* — Wen-Ying P Chen
(74) *Attorney, Agent, or Firm* — Cantor Colburn LLP

(57) ABSTRACT

A liquid crystal display device includes: first and second substrates facing each other and including a plurality of pixels; a liquid crystal layer between the first and second substrates and including a liquid crystal mixture. The first substrate includes a pixel electrode in each pixel. The pixel electrode includes a stem electrode extending in a first direction and a second direction in a cross shape and dividing the pixel into first to fourth domains; and branch electrodes disposed in the first to fourth domains and extending from the stem electrode in a tilted direction to the first and second directions. The branch electrodes disposed in two adjacent domains extend to have angles different from each other with respect to the first direction and the second direction. The liquid crystal mixture includes liquid crystals, and a dopant which adjusts a pitch of the liquid crystals.

18 Claims, 8 Drawing Sheets

(51) Int. Cl.
*G02F 1/1343* (2006.01)
*G02F 1/1333* (2006.01)
*G02F 1/1335* (2006.01)
*G02F 1/1362* (2006.01)
*G02F 1/1368* (2006.01)

(56) References Cited

U.S. PATENT DOCUMENTS

2004/0004690 A1\* 1/2004 Yamaguchi ....... G02F 1/133707
 349/141
2015/0015829 A1\* 1/2015 Chen ................. G02F 1/133707
 349/96

\* cited by examiner

LIQUID CRYSTAL DISPLAY DEVICE

This application claims priority to Korean Patent Application No. 10-2016-0018542, filed on Feb. 17, 2016, and all the benefits accruing therefrom under 35 U.S.C. § 119, the content of which in its entirety is herein incorporated by reference.

BACKGROUND

1. Technical Field

Exemplary embodiments of the inventive concept relate to a liquid crystal display device.

2. Description of the Related Art

A liquid crystal display is one of the most widely used types of flat panel display device, and typically includes two substrates, on which electric field generating electrodes such as a pixel electrode and a common electrode are provided, and a liquid crystal layer interposed between the two substrates. The liquid crystal display is configured to apply voltages to the electric field generating electrodes to generate an electric field in the liquid crystal layer, to thus determine the alignment direction of liquid crystal molecules in the liquid crystal layer and control the polarization of incident light, thereby displaying desired images.

Among such liquid crystal display devices, a vertically aligned mode liquid crystal display device, in which the major axes of the liquid crystal molecules are aligned vertical to upper and lower substrates in the absence of electric field, is promising due to the high contrast ratio and wide reference viewing angle thereof. To achieve wide viewing angle in the vertically aligned mode liquid crystal display, domain forming means such as gaps or protuberances may be generated in the electric field generating electrodes.

SUMMARY

As the liquid crystal display device is miniaturized, or pixels which are the minimum unit having an adjustable grey level become smaller in size to achieve high resolution, reduced aperture ratio caused by components for driving pixels may reduce transmittance. Furthermore, in a case where the minimum number of switching elements and contact holes, e.g., a single switching element and a single contact hole, are provided for each pixel to improve transmittance, a grey level difference may occur between viewing a liquid crystal display device at the front and viewing the liquid crystal display device from the side, thereby causing degradation in side visibility.

Embodiments of the inventive concept provide a liquid crystal display device with improved transmittance and side visibility.

However, embodiments of the inventive concept are not restricted to those set forth herein. The other embodiments of the inventive concept which are not mentioned herein will become more apparent to a person skilled in the art to which the inventive concept pertains by referencing the detailed description of the inventive concept given below.

According to an exemplary embodiment of the disclosure, a liquid crystal display device includes a first substrate and a second substrate, which face each other and include a plurality of pixels, a liquid crystal layer interposed between the first substrate and the second substrate and including a liquid crystal mixture. In such an embodiment, the first substrate includes a pixel electrode in each of the pixels. In such an embodiment, the pixel electrode includes: a stem electrode extending in a first direction and a second direction intersecting the first direction to be disposed in a cross shape, where the stem electrode divides the pixel into first to fourth domains corresponding respectively to four quadrants; and a plurality of branch electrodes disposed in each of the first to fourth domains and extending from the stem electrode in a direction tilted with respect to the first direction and the second direction. In such an embodiment, the branch electrodes disposed in the first domain and the second domain extend to intersect each other, the branch electrodes disposed in the second domain and the third domain extend to intersect each other, the branch electrodes disposed in the third domain and the fourth domain extend to intersect each other, and the branch electrodes disposed in the fourth domain and the first domain extend to intersect each other. In such an embodiment, the branch electrodes disposed in the first to fourth domains extend to have angles different from each other with respect to the first direction and the second direction, and the liquid crystal mixture includes: liquid crystals; and a dopant which adjusts a pitch of the liquid crystals.

According to another exemplary embodiment of the disclosure, a liquid crystal display device includes a first substrate and a second substrate, which face each other and include a plurality of pixels, a liquid crystal layer interposed between the first substrate and the second substrate and including a liquid crystal mixture. In such an embodiment, the first substrate includes a pixel electrode disposed in each of the pixels. In such an embodiment, the pixel electrode includes: a stem electrode extending in a first direction and a second direction intersecting the first direction to be disposed in a cross shape, where the stem electrode divides the pixel into first to fourth domains corresponding respectively to four quadrants; a first domain branch electrode disposed in the first domain and forming an angle in a range from about 15 degrees to about 30 degrees with respect to the first direction and an angle in a range from about 60 degrees to about 75 degrees with respect to the second direction; a second domain branch electrode disposed in the second domain and forming an angle in a range from about 60 degrees to about 75 degrees with respect to the first direction and an angle in a range from about 15 degrees to about 30 degrees with respect to the second direction; a third domain branch electrode disposed in the third domain and forming an angle in a range from about 15 degrees to about 30 degrees with respect to the first direction and an angle in a range from about 60 degrees to about 75 degrees with respect to the second direction; and a fourth domain branch electrode disposed in the fourth domain and forming an angle in a range from about 60 degrees to about 75 degrees with respect to the first direction and an angle in a range from about 15 degrees to about 30 degrees with respect to the second direction. In such an embodiment, the liquid crystal mixture includes liquid crystals, and a dopant which adjusts a pitch of the liquid crystals.

Embodiments of the inventive concept provide a display device with improved transmittance and side visibility.

However, features of embodiments of the inventive concept are not restricted to the exemplary embodiments set forth herein and more diverse effects are included in this description.

BRIEF DESCRIPTION OF THE DRAWINGS

The above and other features of embodiments of the invention will become more apparent by describing in further detail exemplary embodiments thereof with reference to the accompanying drawings, in which.

DETAILED DESCRIPTION

Figure 1:
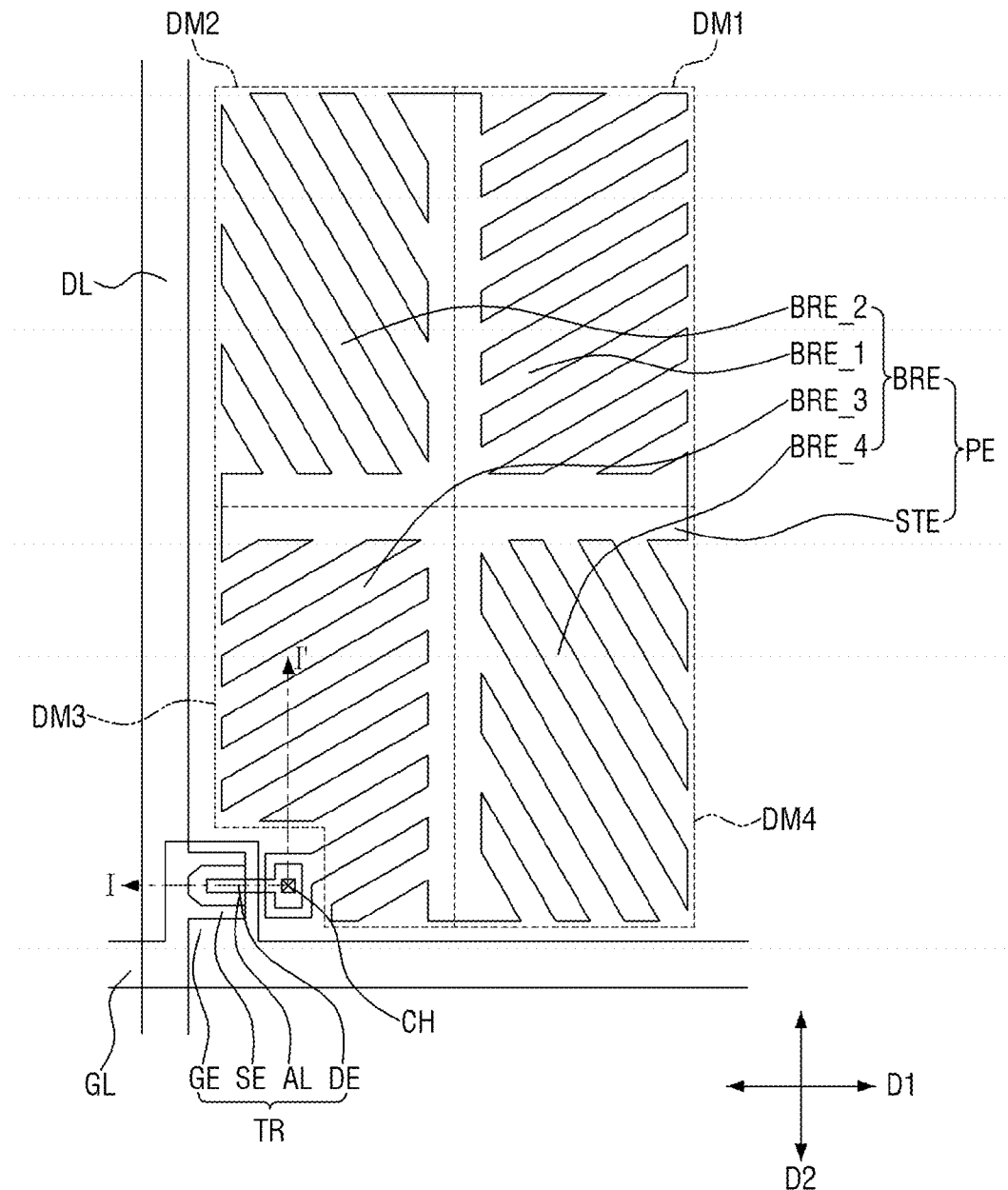
FIG. 1 is a plan view illustrating a pixel of a liquid crystal display device according to an embodiment of the inventive concept.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of the disclosure will hereinafter be described in detail with reference to the accompanying drawings.

Figure 2:
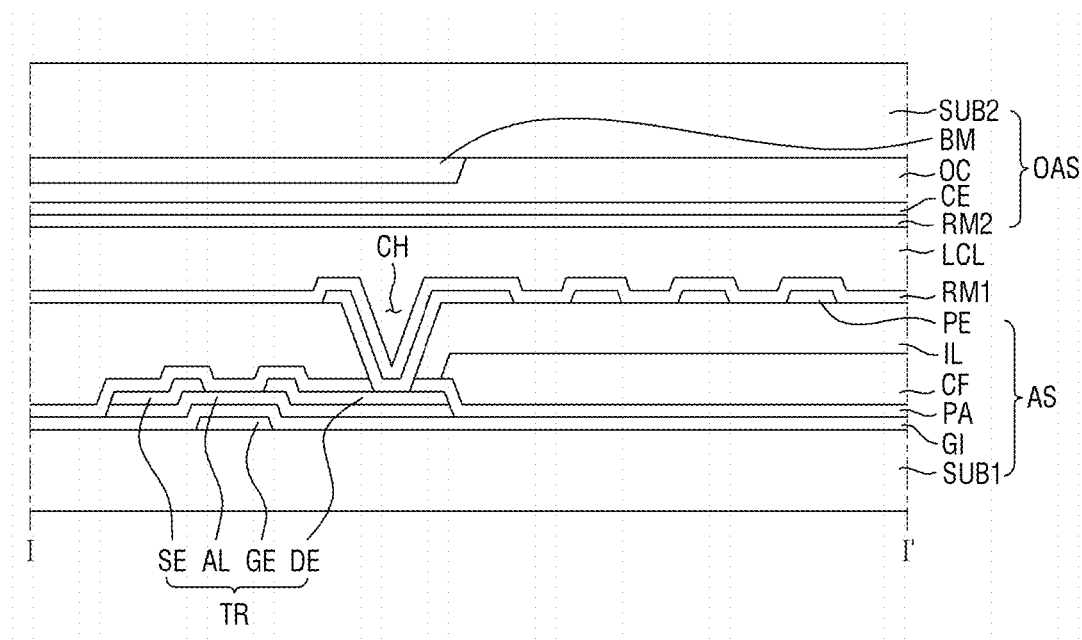
FIG. 2 is a cross-sectional view taken along line I-I' of FIG. 1.

FIG. 1 is a plan view illustrating a pixel of a liquid crystal display device according to an embodiment of the inventive concept. FIG. 2 is a cross-sectional view taken along line I-I' of FIG. 1.

Referring to FIG. 1 and FIG. 2, an embodiment of a liquid crystal display device may include an array substrate AS, an opposing substrate OAS, and a liquid crystal layer LCL.

The array substrate AS may include a transistor TR to drive liquid crystal molecules of the liquid crystal layer LCL, and the opposing substrate OAS may be disposed to face the array substrate AS.

The array substrate 100 will hereinafter be described.

The array substrate may include a first base substrate SUB1. The first base substrate SUB1 may be a transparent insulation substrate. In one embodiment, for example, the first base substrate SUB1 may be a glass substrate, a quartz substrate, a transparent resin substrate and the like. In an embodiment, the first base substrate SUB1 may include polymers or plastics with high heat resistance.

In an embodiment, the first base substrate SUB1 may have flexibility. In such an embodiment, the first base substrate SUB1 may be a transformable substrate which may be rolled, folded or bent, and a curved display device may be manufactured using the first base substrate SUB1.

A gate line GL and a gate electrode GE may be disposed on the first base substrate SUB1. The gate line GL may transmit a gate signal and extend in a first direction D1.

The first direction D1 as used herein may be a direction extending in parallel to one side of the first base substrate SUB1, and may be defined as a direction indicated by an imaginary straight line extending from the left to the right as shown in FIG. 1. However, the disclosure is not limited thereto, and the first direction D1 may be a direction in a specific direction on the first base substrate SUB1.

The gate signal may be applied from an external source and have a varying voltage value, and on/off operation of the transistor TR, which will be described later, may be controlled in correspondence to the voltage value of the gate signal.

The gate electrode GE may be defined by a protruded portion of the gate line GL, or be formed into a shape protruding from the gate line GL, and may be an element constituting the transistor TR, which will be described later. A plurality of gate electrodes GEs may be formed by a single gate line GL. Although a single gate electrode GE may be included in a single pixel as shown in FIG. 1, but the disclosure is not limited thereto.

The gate line GL and the gate electrode GE may include at least one of an aluminum-based metal such as aluminum (Al) or aluminum alloy, silver-based metal such as silver (Ag) or silver alloy, a copper-based metal such as copper (Cu) or copper alloy, a molybdenum-based metal such as molybdenum (Mo) or molybdenum alloy, chrome (Cr), tantalum (Ta), titanium (Ti) and the like. The gate line GL and the gate electrode GE may have a single layer structure, or a multi-layer structure including at least two conductive layers having different physical properties from each other. In an embodiment, where The gate line GL and the gate electrode GE have a multi-layer structure including at least two conductive layers, one conductive layer among the at least two conductive layers may include or be made of low-resistance metal, for example, aluminum-based metal, silver-based metal, copper-based metal and the like to reduce a signal delay or voltage drop, and another conductive layer among the at least two conductive layers may include or be made of a material different from that of the one conductive layer, or may include a material having superior contact characteristics with indium tin oxide ("ITO") and indium zinc oxide ("IZO"), for example, one of a molybdenum-based metal, chrome (Cr), titanium (Ti), tantalum (Ta) and the like. In one embodiment, for example, the multi-layer structure may include a lower chrome layer and an upper aluminum layer, or a lower aluminum layer and an upper molybdenum layer. However, the disclosure is not limited thereto, and the gate line GL and the gate electrode GE may include or be made of various metal and conductors.

A gate insulation layer GI may be disposed on the gate line GL and the gate electrode GE. The gate insulation layer GI may include or be made of an insulation material, for example, silicon nitride, silicon oxide or the like. The gate insulation layer GI may have a single layer structure, or a multi-layer structure including at least two insulation layers having different physical properties from each other.

A semiconductor layer AL may be disposed on the gate insulation layer GI. The semiconductor layer AL may at least partially overlap the gate electrode GE. The semiconductor layer AL may include amorphous silicon, polycrystalline silicon or an oxide semiconductor.

In an embodiment, the semiconductor layer AL may be disposed to overlap not only the gate electrode GE but also at least a part or whole of the data line DL, a source electrode SE and a drain electrode DE, which will be described later, depending on process steps for providing the semiconductor layer AL.

Although not shown in the drawings, in some embodiments, an ohmic contact member may further be disposed on the semiconductor layer AL. The ohmic contact member may include or be made of hydrated amorphous silicon or the like, which is highly doped with n-type impurities, or silicide. The ohmic contact member may be disposed in pairs on the semiconductor layer AL. In some embodiments, where the semiconductor layer AL includes an oxide semiconductor, the ohmic contact may be omitted.

The data line DL, the source electrode SE and the drain electrode DE may be disposed on the gate insulation layer GI and the semiconductor layer AL. The data line DL may extend in a second direction D2 and intersect the gate line GL.

The second direction D2 as used herein may be a direction perpendicularly intersecting the first direction D1, and may be defined as a direction indicated by an imaginary straight line extending from the top to the bottom as shown in FIG. 1. However, the disclosure is not limited thereto, and an angle formed between the second direction D2 and the first direction D1 may not be a right angle. In such an embodiment, the second direction D2 may be a direction which is non-parallel to the first direction D1.

The data line DL may be insulated from the gate line GL by the gate insulation layer GI.

The data line DL may provide the source electrode SE with a data signal input from an external source. In such an embodiment, the data signal may be applied from the external source and have a varying voltage value, and a grey level of each pixel may be controlled in correspondence to the data signal.

The source electrode SE may be branched from the data line DL and at least partially overlap the gate electrode GE. The drain electrode DE may be spaced apart from the source electrode SE with the semiconductor layer AL interposed therebetween, and may at least partially overlap the gate electrode GE. In an embodiment, as shown in FIG. 1, the source electrode may have a U-like shape enclosing the drain electrode DE with predetermined spacing between the source electrode SE and the drain electrode DE. However, the arrangement of the source electrode SE and the drain electrode DE is merely exemplary, and the disclosure is not limited thereto. In one alternative embodiment, for example, the source electrode SE may be formed into a rod shape parallel to and spaced apart from the drain electrode DE with predetermined spacing therebetween.

In an embodiment, the data line DL, the source electrode SE and the drain electrode DE may include or be made of aluminum, copper, silver, molybdenum, chrome, titanium, tantalum or an alloy thereof. In an embodiment, the data line DL, the source electrode SE and the drain electrode DE may have a multi-layer structure including or formed of a lower layer (not shown) including refractory metal and the like and a low-resistance upper layer (not shown) on the lower layer, but the disclosure is not limited thereto.

The gate electrode GE, the semiconductor layer AL, the source electrode SE and the drain electrode DE may collectively define a transistor TR.

The transistor TR may electrically interconnect the source electrode SE and the drain electrode DE in correspondence to a voltage value of the gate signal provided to the gate electrode GE. Specifically, when the voltage value of the gate signal provided to the gate electrode GE is value that turns off the transistor TR, the source electrode SE and the drain electrode DE may be electrically insulated. When the voltage value of the gate signal provided to the gate electrode GE is a value that turns on the transistor TR, the source electrode SE and the drain electrode DE may be electrically interconnected through a channel formed in the semiconductor layer AL interposed between the source electrode SE and the drain electrode DE.

The channel may be formed in a portion of the semiconductor layer AL between the source electrode SE and the drain electrode DE. In an embodiment, when the transistor TR is in a turned-on state, the channel may be formed in the semiconductor layer AL interposed between the source electrode SE and the drain electrode DE, and voltages may be transmitted and current flows along the channel. Accordingly, the data signal provided to the data line DL may be transmitted, through the drain electrode DE, to the pixel electrode PE connected to the drain electrode DE, and whether the data signal is transmitted or not may be controlled by the gate signal provided to the gate line GL. The pixel electrode PE will be described in detail later.

In an embodiment, only a single transistor TR may be disposed in each pixel. In such an embodiment, each of the components constituting the transistor TR may not transmit light provided from below the first base substrate SUB1, a liquid crystal display device may become maximum in transmittance when the number of the transistor TR is the minimum.

A passivation layer PA may be disposed on the gate insulation layer GI and the transistor TR. The passivation layer PA may include or be made of an organic insulation material or an inorganic insulation material, and cover the transistor TR.

A color filter CF may be disposed on the passivation layer PA. The color filter CF may pass only a component of a certain wavelength range of light incident from the outside of the first base substrate SUB1, and block components of other wavelength ranges such that the light passed through the color filter CF and emitted outside a second base substrate SUB2 may be recognized as a certain color light.

In one embodiment, for example, a red color filter may pass light in a wavelength range from an about 580 nanometers (nm) to 780 nm, and absorb (and/or reflect) light of the other wavelength range. A green color filter may pass light in a wavelength range from about 450 nm to about 650 nm and absorb light of the other wavelength range. A blue color filter may pass light in a wavelength range from about 380 nm to about 560 nm and absorb light of the other wavelength range. The red color filter may include or be made of pigment or a photosensitive organic material for expressing a red color, the green color filter may include or be made of pigment or a photosensitive organic material for expressing a green color, and the blue color filter may include or be made of pigment or a photosensitive organic material for expressing a blue color.

However, an arrangement of the color filter CF is not limited thereto, and in some embodiments, the color filter CF may be disposed on the second base substrate SUB2, which will be described later.

A planarization layer IL may be disposed on the color filter CF. The planarization layer IL may planarize a top portion, e.g., a top surface, of the layers therebelow, e.g., the passivation layer PA and the color filter CF. The planarization layer IL may include or be made of an organic matter. However, the disclosure is not limited thereto, and the planarization layer IL may include or be made of a photosensitive organic composition, or a separate photosensitive organic composition may be additionally disposed below the planarization layer IL. In an embodiment, the planarization layer IL may include or be made of a material including a photosensitive organic composition and pigment for expressing a color, or a photosensitive organic composition layer including pigment for expressing a color may be additionally disposed below another planarization layer IL. In one embodiment, for example, the planarization layer IL may include or be made of a photosensitive organic composition including any one of red, green, and blue pigments. In such an embodiment, the planarization layer IL may also function as the color filter CF described above.

A contact hole CH which exposes a part of the transistor TR, e.g., a part of the drain electrode DE, may be defined or formed in the planarization layer IL and the passivation layer PA. The contact hole CH may be formed into a shape perpendicularly penetrating through the planarization layer IL and the passivation layer PA. The contact hole CH may expose a part of the drain electrode DE and overlap a part of the drain electrode DE. The part of the drain electrode DE and the pixel electrode PE disposed on the planarization layer IL, which will be described later, may be physically and electrically interconnected through a conductive material provided within the contact hole CH. In such an embodiment, the conductive material provided within the contact hole CH may be a part of the pixel electrode, which will be described later.

In an embodiment, where only a single transistor TR is disposed in one pixel as described above, only a single contact hole CH may be defined in the one pixel. Since the contact hole CH overlaps the drain electrode DE, light provided from below the first base substrate SUB1 may not be transmitted, and thus transmittance of a liquid crystal display device may be increased as the number of the contact holes CH is decreased.

The pixel electrode PE may be disposed on the planarization layer IL. The pixel electrode PE may be physically connected to the drain electrode DE through the contact hole CH to receive voltages from the drain electrode DE.

The pixel electrode PE may include or be made of a transparent conductive material such as ITO, IZO, indium tin zinc oxide ("ITZO"), and Al-doped zinc oxide ("AZO").

The pixel electrode PE may include a stem electrode STE and a plurality of branch electrodes BRE. In an embodiment, the stem electrode STE may extend into a cross shape in the first direction D1 and the second direction D2 to divide a region of a pixel in which the pixel electrode PE is disposed into four domains. The four domains correspond respectively to first to fourth quadrants of the cross shape, and the domain corresponding to the first quadrant may be defined as a first domain DM1, the domain corresponding to the second quadrant may be defined as a second domain DM2, the domain corresponding to the third quadrant may be defined as a third domain DM3, and the domain corresponding to the fourth quadrant may be defined as a fourth domain DM4, as shown in FIG. 1.

The branched electrodes BRE may extend from the stem electrode STE in a direction tilted with respect to both the first direction D1 and the second direction D2. In an embodiment, the branch electrodes BRE may be disposed parallel to each other with spacing therebetween, and a slit SL which is an opening coved with no transparent conductive material may be formed between the branch electrodes BRE. Since the branch electrodes BRE may be disposed parallel to each other with spacing therebetween in each of the first to fourth domains DM1 to DM4, slits SL may be disposed parallel to each other with spacing therebetween.

In an embodiment, the branch electrodes BRE disposed in the first domain DM1 and the branch electrodes BRE disposed in the second domain DM2 may extend to intersect each other. In such an embodiment, an imaginary straight line extending laterally along the branch electrodes BRE disposed in the first domain DM1 and an imaginary straight line extending laterally along the branch electrodes BRE disposed in the second domain DM2 may intersect each other.

In an embodiment, the branch electrodes BRE disposed in the second domain DM2 and the branch electrodes BRE disposed in the third domain DM3 may extend to intersect each other, the branch electrodes BRE disposed in the third domain DM3 and the branch electrodes BRE disposed in the fourth domain DM4 may extend to intersect each other, and the branch electrodes BRE disposed in the fourth domain DM4 and the branch electrodes BRE disposed in the first domain DM1 may extend to intersect each other.

In such an embodiment, in two adjacent domains among the first to fourth domains DM1 to DM4, the branch electrodes BRE disposed respectively in the two adjacent domains may intersect each other.

In an embodiment, the branch electrodes BRE disposed in the first to fourth domains DM1 to DM4 may extend to have angles different from each other with respect to the first direction D1 and the second direction D2. In such an embodiment, the branch electrodes BRE may extend to have an angle that is neither about 45 degrees with respect to the first direction D1, nor about 45 degrees with respect to the second direction D2.

The angle formed between the branch electrodes BRE and the first direction D1 as used herein may be an acute angle formed when an imaginary straight line extending laterally along the branch electrodes BRE intersects an imaginary straight line extending laterally along the first direction D1. The angle formed between the branch electrodes BRE and the second direction D2 as used herein may be an acute angle formed when an imaginary straight line extending laterally along the branch electrodes BRE intersects an imaginary straight line extending laterally along the second direction D2.

Herein, the branch electrodes BRE disposed in the first domain DM1 will be referred to as first domain branch electrodes BRE_1, the branch electrodes BRE disposed in the second domain DM2 will be referred to as second domain branch electrodes BRE_2, the branch electrodes BRE disposed in the third domain DM3 will be referred to as third domain branch electrodes BRE_3, and the branch electrodes BRE disposed in the fourth domain DM4 will be referred to as fourth domain branch electrodes BRE_4. In an embodiment, the first domain branch electrodes BRE_1 may form an angle of about 30 degrees with respect to the first direction D1, and an angle of about 60 degrees with respect to the second direction D2. The second domain branch electrodes BRE_2 may form an angle of about 60 degrees with respect to the first direction D1, and an angle of about 30 degrees with respect to the second direction D2. The third domain branch electrodes BRE_3 may form an angle of about 30 degrees with respect to the first direction D1, and an angle of about 60 degrees with respect to the second direction D2. The fourth domain branch electrodes BRE_4 may form an angle of about 60 degrees with respect to the first direction D1, and an angle of about 30 degrees with respect to the second direction D2.

Such arrangement of the branch electrodes BRE may improve transmittance and visibility of a liquid crystal display device. In such an embodiment, the transmittance and visibility may be unexpectedly improved as compared with a case where all of the branch electrodes BRE disposed in the first to fourth domains DM1 to DM4 have an angle of about 45 degrees with respect to the first direction D1 and do not have an angle of about 45 degrees with respect to the second direction D2.

However, such improvements may be obtained in association with a composition of a liquid crystal mixture contained in the liquid crystal layer LCL, which will be described later, and thus the detailed description thereof will be provided later.

A first alignment layer RM1 may be disposed on the pixel electrode PE. The first alignment layer RM1 may pretilt liquid crystal molecules of the liquid crystal mixture disposed in the liquid crystal layer LCL, which will be described later. In an embodiment, the first alignment layer RM1 may align the liquid crystal molecules in a way such that the liquid crystal molecules may be tilted at an angle of about 0.5 degree to about 3 degrees with respect to the direction perpendicular to the plane on which the first alignment layer RM1 is disposed, at a state where no electric field is applied to the liquid crystal layer LCL.

The opposing substrate OAS will hereinafter be described in detail.

In an embodiment, as shown in FIG. 2, the opposing substrate OAS may include the second base substrate SUB2, the common electrode CE, an overcoat layer OC and a second alignment layer RM2.

The second base substrate SUB2 may be disposed to face the first base substrate SUB1, and have durability against a predetermined impact applied from an outside. The second base substrate SUB2 may be a transparent insulation substrate similarly to the first base substrate SUB1. In one embodiment, for example, the second base substrate SUB2 may be a glass substrate, a quartz substrate, a transparent resin substrate or the like. In an embodiment, the second base substrate SUB2 may include polymers or plastics with high heat resistance. The second base substrate SUB2 may be flat or curved in a predetermined direction. In some embodiments, the second base substrate SUB2 may have flexibility. In such embodiments, the second base substrate SUB2 may be a flexible or transformable substrate which may be rolled, folded or bent.

A light blocking member BM may be disposed on ("beneath" in the drawings) the second base substrate SUB2. The light blocking member BM may overlap the transistor TR, the contact hole CH, the gate line GL and the data line GL as shown in FIG. 2, and thus effectively prevent light leakage caused by misalignment of liquid crystal molecules or reflection of light caused by the transistor TR, the contact hole CH, the gate line GL or the data line GL from being viewed.

The overcoat layer OC may be disposed on ("beneath" in the drawings) the second base substrate SUB2 and the light blocking member BM. The overcoat layer OC may relieve stepped portions caused by the light blocking member BM. In some embodiments, the overcoat layer OC may be omitted as needed.

The common electrode CE may be disposed on ("beneath" in the drawings) the overcoat layer OC. The common electrode CE may include or be made of a transparent conductive material, and have a plate shape all over the whole surface of the second base substrate SUB2. The common electrode CE may receive a common signal to operate with the above-described pixel electrode PE in generating an electric field in the liquid crystal layer LCL.

The second alignment layer RM2 may be disposed on ("beneath" in the drawings) the common electrode CE. The second alignment layer RM2 may perform a function substantially the same as that of the first alignment layer RM1 described above. In an embodiment, the second alignment layer RM2 may pretilt the liquid crystals disposed in the liquid crystal layer LCL.

The liquid crystal layer will hereinafter be described in detail.

The array substrate AS and the opposing substrate OAS may be disposed respectively beneath and on the liquid crystal layer LCL, and thus the liquid crystal layer LCL may be interposed between the two substrates and include a liquid crystal mixture therein.

In an embodiment, the liquid crystal mixture may include a plurality of liquid crystals having dielectric anisotropy, for example, nematic liquid crystals. The liquid crystal molecules between the array substrate AS and the opposing substrate OAS may be treated with ultraviolet rays to be aligned perpendicularly to the array substrate AS and the opposing substrate OAS.

The liquid crystal mixture may be formed and treated with ultraviolet rays by the following processes. First, a mixture including liquid crystals, an ultraviolet curable monomer, and an initiator for ultraviolet curing may be interposed between the array substrate AS and the opposing substrate OAS by using, for example, a vacuum injection. The ultraviolet curable monomer may be, for example, an acrylate-based monomer, and the initiator for ultraviolet curing may include or be made of a material capable of being absorbed to an ultraviolet region, and may be, for example, 2-dimethoxy-1,2-diphenylethanone. Subsequently, pretilt power may be applied to the array substrate AS and the opposing substrate OAS. The pretilt power may be applied through pad units separately provided to the respective array substrate AS and opposing substrate OAS. The array substrate AS and the opposing substrate OAS where the pretilt power is applied may be irradiated with ultraviolet rays to form a liquid crystal mixture. In such a process, the pretilt power may have a voltage maintained in a range from about 2 volts (V) to about 10 V. The pretilt power may be alternating or direct current. Furthermore, energy supplied to a liquid crystal display device by irradiating ultraviolet rays may be in a range of about 2 joules per square centimeter ($J/cm^2$) to about 36 $J/cm^2$. The ultraviolet rays may have a wavelength in a range of about 320 nm to about 380 nm. The ultraviolet ray irradiating condition may be adjusted depending on the quantity of added ultraviolet curable monomers. The ultraviolet ray irradiating process may be performed immediately after the injection of the liquid crystals and the like such that the monomers are effectively prevented from being hardened prior to the ultraviolet ray irradiation. When ultraviolet rays are irradiated at the state where the pretilt power is applied to the liquid crystal display device as described above, ultraviolet curable monomers may be hardened to enable the liquid crystals to pretilt. The pretilt power may enable the liquid crystals to have a direction tilted at an angle in a range from about 0.5 degree to about 3 degree relatively to the direction perpendicular to the array substrate AS and the opposing substrate OAS.

In an liquid crystal display device completed by the formation of the liquid crystal mixture, when an electric field is applied between the array substrate AS and the opposing substrate OAS, the liquid crystal molecules may tilt in a certain direction between the array substrate AS and the opposing substrate OAS to change the polarization state of the light passing through the liquid crystal layer, thus enabling the liquid crystal display device to pass or block the light on a pixel unit basis.

In an embodiment, the direction in which the liquid crystal molecules tilt may be determined by a pattern of the pixel electrode PE disposed beneath the liquid crystal molecules. In an embodiment, the branch electrodes BRE disposed in the first to fourth domains DM1 to DM4 may extend in different directions, and thus directions in which the liquid crystal molecules tilt may be different in the first to fourth domains DM1 to DM4.

In an embodiment, a chiral dopant which adjusts a pitch of liquid crystals may be added to the liquid crystal mixture. The chiral dopant may have an asymmetric carbon atom at a center thereof. The pitch of the liquid crystals is a distance that allows for the liquid crystals to rotate once in a helical pattern.

In an embodiment, to improve transmittance of the liquid crystal display device, a ratio of a cell gap, which is the distance of a gap between the array substrate AS and the opposing substrate OAS, to the pitch of the liquid crystal mixture (a value obtained by dividing the cell cap by the pitch) may have a value in a range from about 0.25 to about 0.33. When the ratio of the cell gap to the pitch of the liquid crystal mixture is in the above range, the liquid crystals disposed adjacent to the array substrate AS and the liquid crystals disposed adjacent to the opposing array substrate OAS may be twisted to have a difference of about 90 degrees therebetween.

In an embodiment, the chiral dopant is added to the liquid crystal mixture and the branch electrodes BRE of the pixel electrode PE is shaped as above described, thereby improving transmittance and visibility of the liquid crystal display device. This will be described in greater detail later with reference to FIG. 4 to FIG. 7.

To improve transmittance of the liquid crystal display device, a product of dielectric anisotropy and the cell gap may have a value in a range from about 390 nm to about 500 nm. When the product of dielectric anisotropy and the cell gap is in the above range, the influence of the polarization direction of the light incident to the liquid crystal display device may be minimized, thereby improving transmittance. In one embodiment, for example, when the cell gap has a value of about 3 micrometers (μm), dielectric anisotropy may have a value in a range from about 0.13 to about 0.166. This will be described in greater detail later with reference to FIG. 8.

Figure 3:
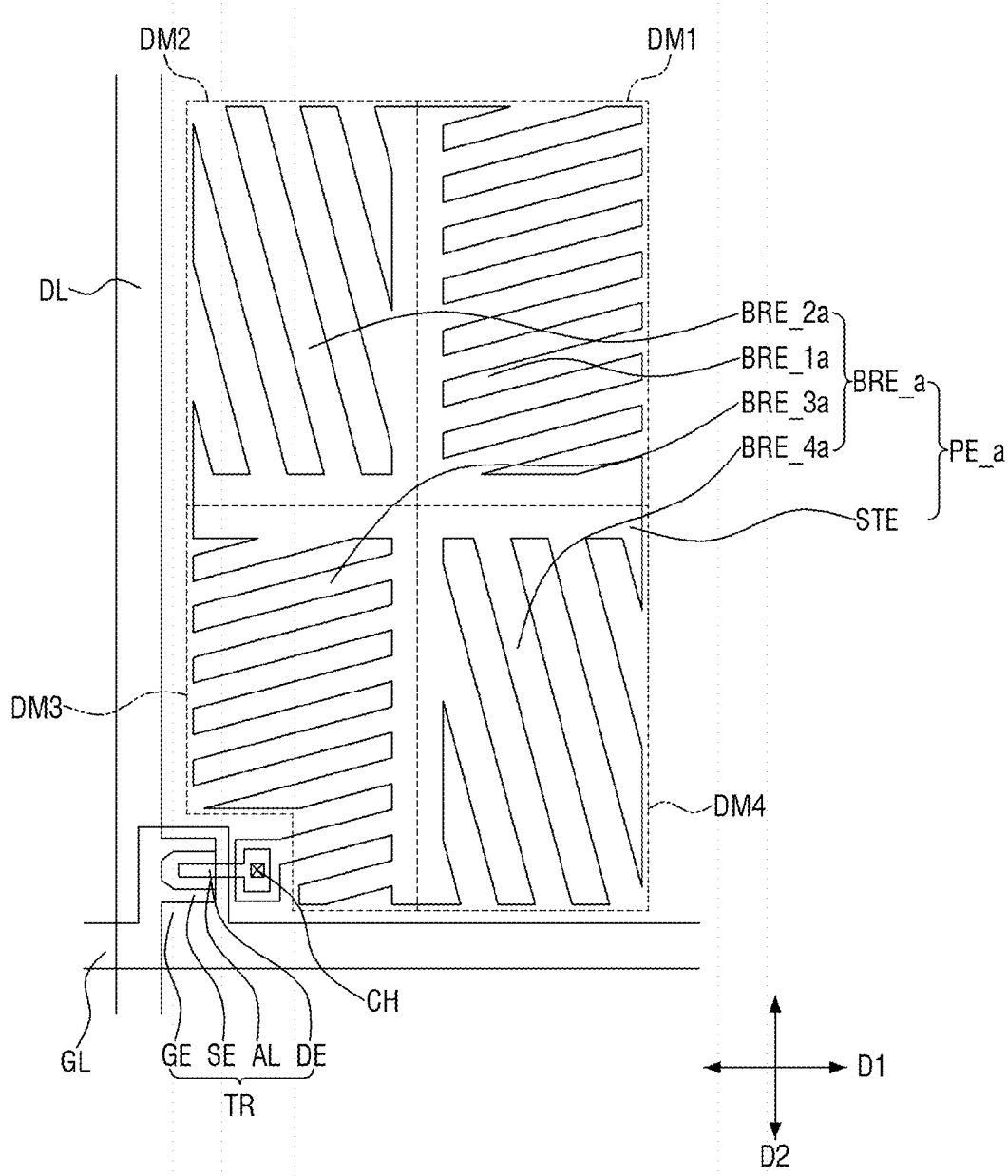
FIG. 3 is a plan view illustrating a pixel of a liquid crystal display device according to an alternative embodiment of the inventive concept.

FIG. 3 is a plan view illustrating a pixel of a liquid crystal display device according to an alternative embodiment of the inventive concept.

The embodiment of the pixel shown in FIG. 3 is substantially the same as the embodiment of the pixel shown in FIG. 1 expect for angles formed respectively between each of the branch electrodes BRE_a and the first direction D1 and the second direction D2. The same or like elements shown in FIG. 3 have been labeled with the same reference characters as used above to describe the embodiment of the pixel shown in FIG. 1, and any repetitive detailed description thereof will hereinafter be omitted or simplified.

In an embodiment as shown in FIG. 3, the first domain branch electrodes BRE_1a may form an angle of about 15 degrees with respect to the first direction D1, and an angle of about 75 degrees with respect to the second direction D2. The second domain branch electrodes BRE_2a may form an angle of about 75 degrees with respect to the first direction D1, and an angle of about 15 degrees with respect to the second direction D2. The third domain branch electrodes BRE_3a may form an angle of about 15 degrees with respect to the first direction D1, and an angle of about 75 degrees with respect to the second direction D2. The fourth domain branch electrodes BRE_4a may form an angle of about 75 degrees with respect to the first direction D1, and an angle of about 15 degrees with respect to the second direction D2.

This arrangement of the branch electrodes BRE may further increase transmittance as compared with the liquid crystal display device shown in FIG. 1.

In an embodiment, as described above with reference to FIG. 1, a liquid crystal display device is illustrated in which each of the branch electrodes BRE may have an angle of about 30 degrees or about 60 degrees with respect to the first direction D1 or the second direction D2. In an embodiment, as described above with reference to FIG. 3, a liquid crystal display device is illustrated in which each of the branch electrodes BRE may have an angle of about 15 degrees or about 75 degrees with respect to the first direction D1 or the second direction D2. However, the disclosure is not limited thereto. In one alternative embodiment, for example, each of the branch electrodes BRE contained in the pixel electrode may have an angle in a range from about 15 degrees to about 30 degrees with respect to the first direction D1, and in a range from about 60 degrees to about 75 degrees with respect to the second direction D2. In an embodiment, each of the branch electrodes BRE of the pixel electrode may have an angle in a range from about 60 degrees to about 75 degrees with respect to the first direction D1, and in a range from about 15 degrees to about 30 degrees with respect to the second direction D2. However, in such an embodiment, the sum of the angle formed between each of the branch electrodes BRE and the first direction and the angle formed between each of the branch electrodes BRE and the second direction D2 is about 90 degrees.

Figure 4:
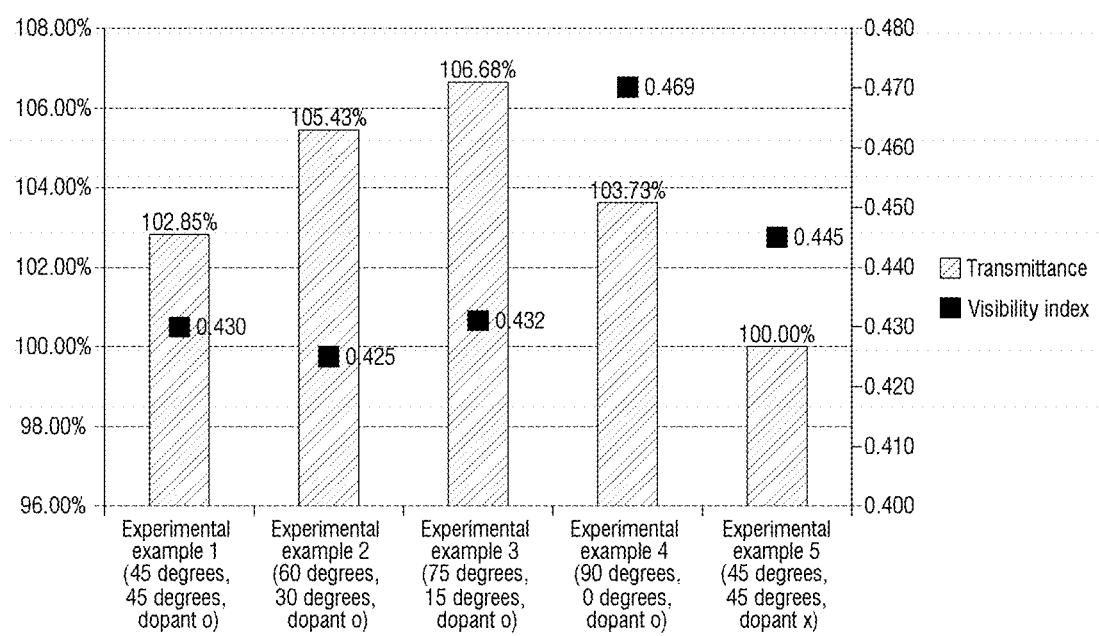
FIG. 4 is a graphical representation illustrating transmittance and visibility of a liquid crystal display device depending on liquid crystal mixtures under various conditions and structures of pixel electrodes.

FIG. 4 is a graphical representation illustrating transmittance and visibility of a liquid crystal display device depending on liquid crystal mixtures under various conditions and structures of pixel electrodes.

FIG. 4 illustrates measurement results on the transmittance and visibility index in experimental example 1 to experimental example 5. Specifically, experimental example 1 indicates a liquid crystal display device in which branch electrodes BRE form an angle of about 45 degrees with respect to the first direction D1 or the second direction D2, and a chiral dopant is added to the liquid crystal mixture. Experimental example 2 indicates a liquid crystal display device in which branch electrodes BRE form an angle of about 60 degrees or about 30 degrees with respect to the first direction D1 or the second direction D2, and a chiral dopant is added to the liquid crystal mixture, e.g., an embodiment of the liquid crystal display device described above with reference to FIG. 1. Experimental example 3 indicates a liquid crystal display device in which branch electrodes BRE form an angle of about 75 degrees or about 15 degrees with respect to the first direction D1 or the second direction D2, and a chiral dopant is added, e.g., an embodiment of the liquid crystal display device described above with reference to FIG. 3. Experimental example 4 indicates a liquid crystal display device in which branch electrodes BRE form an angle of about 90 degrees or about zero (0) degree with respect to the first direction D1 or the second direction D2, and a chiral dopant is added to the liquid crystal mixture. Experimental example 5 indicates a general liquid crystal display device in which branch electrodes BRE form an angle of about 45 degrees with respect to the first direction D1 or the second direction D2, and no chiral dopant is added to the liquid crystal mixture.

Referring to FIG. 4, when a conventional liquid crystal display device, e.g., a liquid crystal display device in which branch electrodes BRE form an angle of about 45 degrees with respect to the first direction D1 or the second direction D2, and no chiral dopant is added thereto has transmittance 100%, the liquid crystal display device of experimental example 1 which has an arrangement of branch electrodes BRE the same as that of the experimental example 5 but contains a chiral dopant added thereto has improved transmittance and visibility index lowered from 0.445 to 0.430.

In experimental example 2 in which the chiral dopant is added like experimental example 1, but the branch electrodes BRE form an angle of about 60 degrees or about 30 degrees with respect to the first direction D1 or the second direction D2 unlike experimental example 1, transmittance and visibility index are further improved as compared with experimental example 1.

In experimental example 3 in which the chiral dopant is added like experimental example 2, but the branch electrodes BRE form an angle of about 75 degrees or about 15 degrees with respect to the first direction D1 or the second direction D2 unlike experimental example 1, transmittance is further improved as compared with experimental example 2. However, experimental example 3 has a degraded visibility as compared with experimental example 2, and thus the condition of experimental example 2 or experimental example 3 may be selected in consideration of transmittance and visibility.

In experimental example 4 in which the chiral dopant is added like experimental example 2 and experimental example 3, but the branch electrodes BRE form an angle of about 90 degrees or 0 degree with respect to the first direction D1 or the second direction D2 unlike experimental example 2 and experimental example 3, both transmittance and visibility are degraded as compared with experimental example 2 and experimental example 3. Accordingly, it is understood that enabling the branch electrodes BRE to tilt as much as possible with respect to the first direction D1 or the second direction D2 may not improve transmittance and visibility.

This will be described in greater detail with reference to FIG. 5 to FIG. 7.

Figure 5:
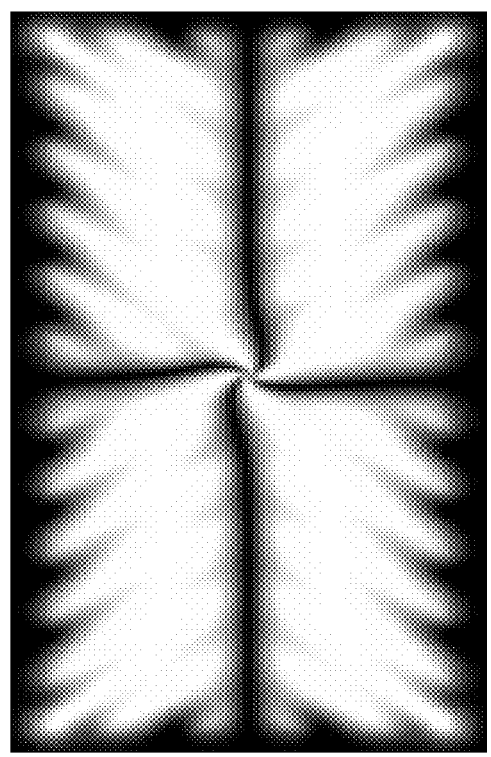
FIG. 5 is a photograph illustrating a pixel of a liquid crystal display device corresponding to experimental example 5 of FIG. 4.

FIG. 5 is a photograph illustrating a pixel of a liquid crystal display device corresponding to experimental example 5 of FIG. 4. FIG. 6 is a photograph illustrating a pixel of a liquid crystal display device corresponding to experimental example 1 of FIG. 4. FIG. 7 is a photograph illustrating a pixel of a liquid crystal display device corresponding to experimental example 2 of FIG. 4.

Referring first to FIG. 5, in the liquid crystal display device corresponding to experimental example 5 of FIG. 4, a cross-shaped dark portion is clearly viewed in a center region and a dark portion is also clearly viewed in an end region of the branch electrodes BRE.

Figure 6:
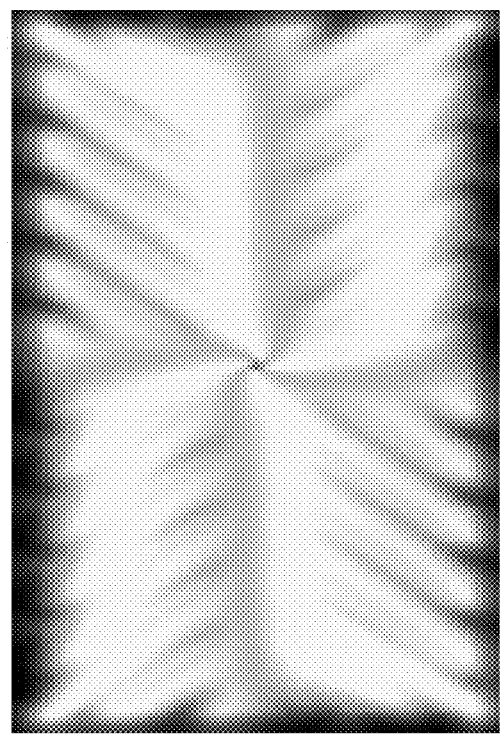
FIG. 6 is a photograph illustrating a pixel of a liquid crystal display device corresponding to experimental example 1 of FIG. 4.

Referring next to FIG. 6, in the liquid crystal display device corresponding to experimental example 1 of FIG. 4, as liquid crystals rotate in a helical pattern by the addition of the chiral dopant, the cross-shaped dark portion viewed in FIG. 5 is thinned to achieve improved transmittance, and the dark portion in the end region of the branch electrodes BRE is also thinned to achieve improved transmittance.

Furthermore, the cross-shaped dark portion viewed in FIG. 5 changes to a shape close to X. This change may be caused by the rotation of the liquid crystals resulting from the addition of the chiral dopant unlike experimental example 5.

Figure 7:
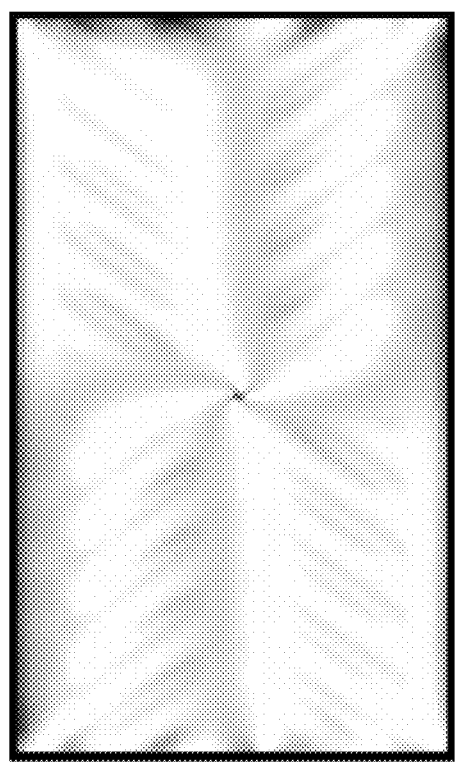
FIG. 7 is a photograph illustrating a pixel of a liquid crystal display device corresponding to experimental example 2 of FIG. 4.

Referring next to FIG. 7, in the liquid crystal display device corresponding to experimental example 2 of FIG. 4, that is, in the liquid crystal display device according to an embodiment shown in FIG. 1, the cross-shaped dark portion viewed in FIG. 6 is thinned to achieve improved transmittance, and the dark portion in the end region of the branch electrodes BRE is also thinned to achieve improved transmittance.

In an embodiment, as liquid crystals rotate in a helical pattern by the addition of the chiral dopant, an angle formed between the branch electrodes BRE and the first direction D1 or the second direction D2 becomes asymmetric, a polarization state of light passing through the liquid crystal display device becomes further optimized, thereby improving transmittance.

Figure 8:
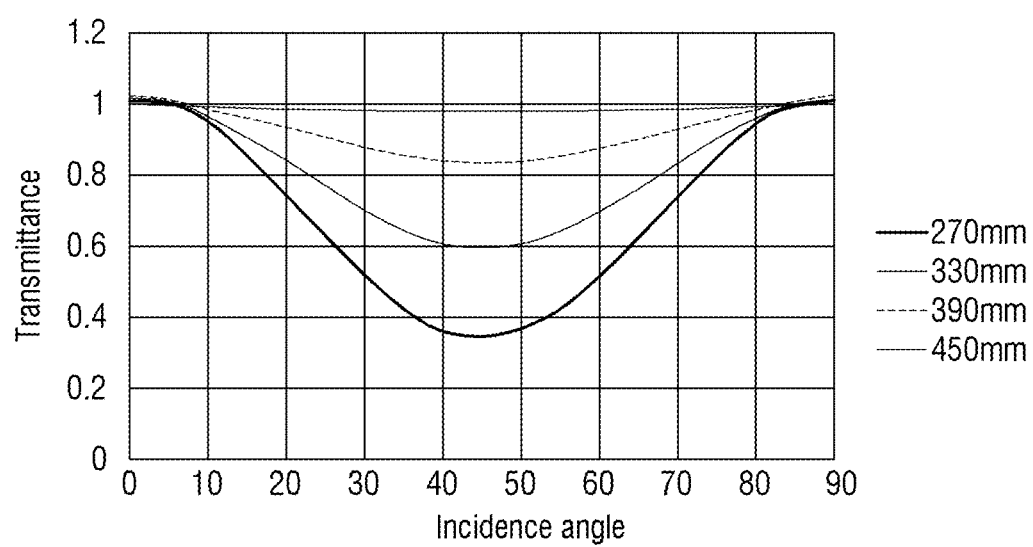
FIG. 8 is a graph illustrating transmittance depending on a polarization state of light and a product of dielectric anisotropy and a cell gap.

FIG. 8 is a graph illustrating transmittance depending on a polarization state of light and a product of dielectric anisotropy and a cell gap.

Referring to FIG. 8, when a product of dielectric anisotropy and a cell gap has a value of about 270 nm, deviation of transmittance depending on the incidence angle of light incident to a liquid crystal display device is remarkably large. In this case, the incidence angle of light incident to the liquid crystal display device may be an angle formed between the light and a transmission axis of a polarizing plate attached to an outer surface of the array substrate AS.

When a product of dielectric anisotropy and a cell gap has a value of about 330 nm, deviation of transmittance depending on the incidence angle of light incident to the liquid crystal display device is relieved as compared with the case where the product of dielectric anisotropy and a cell gap has a value of about 270 nm.

Similarly, as the product of dielectric anisotropy and a cell gap increases, deviation of transmittance depending on the incidence angle of light incident to the liquid crystal display device is relieved.

However, excessive increase in a cell gap of the liquid crystal display may cause difficulty in adjusting a ratio between the pitch of the liquid crystal mixture and the cell gap, and thus increase in a cell gap of the liquid crystal display may be limited. Furthermore, excessive increase in dielectric anisotropy may cause excessive increase in viscosity of the liquid crystal mixture, thereby degrading response speed. Thus, an optimized value of the product of dielectric anisotropy and a cell gap may be in a range from about 390 nm to about 500 nm, which effectively improves transmittance, allows for ease of cell gap adjustment, and causes no loss in terms of response speed.

Some exemplary embodiments of the disclosure have been described with reference to the accompanying drawings. However, those skilled in the art will appreciate that many variations and modifications may be made to the disclosed embodiments without substantially departing from the principles of the disclosure. Therefore, the disclosed embodiments of the disclosure are used in a generic and descriptive sense only and not for purposes of limitation.

What is claimed is:

1. A liquid crystal display device comprising:
a first substrate and a second substrate, which faces each other and comprise a plurality of pixels;
a liquid crystal layer interposed between the first substrate and the second substrate and comprising a liquid crystal mixture; and
wherein the first substrate comprises a pixel electrode disposed in each of the pixels,
wherein the pixel electrode comprises:
a stem electrode extending in a first direction and a second direction intersecting the first direction to be disposed in a cross shape, wherein the stem electrode divides the pixel into first to fourth domains corresponding respectively to four quadrants; and
a plurality of branch electrodes disposed in each of the first to fourth domains and extending from the stem electrode in a direction tilted with respect to the first direction and the second direction,
wherein the branch electrodes in the first domain and the second domain extend to intersect each other, the branch electrodes disposed in the second domain and the third domain extend to intersect each other, the branch electrodes disposed in the third domain and the fourth domain extend to intersect each other, and the branch electrodes disposed in the fourth domain and the first domain extend to intersect each other,
wherein the branch electrodes disposed in the first to fourth domains extend to have angles different from each other with respect to the first direction and the second direction,
wherein the liquid crystal mixture comprises: liquid crystals; and a dopant which adjusts a pitch of the liquid crystals, and
wherein a product of dielectric anisotropy of the liquid crystal mixture and the cell gap has a value in a range from about 390 nanometers to about 500 nanometers.

2. The liquid crystal display device of claim 1, wherein
the branch electrodes comprises a first domain branch electrode disposed in the first domain, a second domain branch electrode disposed in the second domain, a third domain branch electrode disposed in the third domain, and a fourth domain branch electrode disposed in the fourth domain,
the first domain branch electrode and the third domain branch electrode form an angle of about 30 degrees with respect to the first direction, and an angle of about 60 degrees with respect to the second direction, and
the second domain branch electrode and the fourth domain branch electrode form an angle of about 60 degrees with respect to the first direction, and an angle of about 30 degrees with respect to the second direction.

3. The liquid crystal display device of claim 1, wherein
the branch electrodes comprises a first domain branch electrode disposed in the first domain, a second domain branch electrode disposed in the second domain, a third domain branch electrode disposed in the third domain, and a fourth domain branch electrode disposed in the fourth domain, the first domain branch electrode and the third domain branch electrode form an angle of about 15 degrees with respect to the first direction, and an angle of about 75 degrees with respect to the second direction, and the second domain branch electrode and the fourth domain branch electrode form an angle of about 75 degrees with respect to the first direction, and an angle of about 15 degrees with respect to the second direction.

4. The liquid crystal display device of claim 1, wherein the dopant is a chiral dopant.

5. The liquid crystal display device of claim 1, wherein a ratio of a cell gap, which is a distance of a gap between the first substrate and the second substrate, to the pitch of the liquid crystal mixture has a value in a range from about 0.25 to about 0.33.

6. The liquid crystal display device of claim 1, wherein the dielectric anisotropy of the liquid crystal mixture has a value in a range from about 0.13 to about 0.166.

7. The liquid crystal display device of claim 1, wherein the cell gap has a value in a range from about 2.8 micrometers to about 3.2 micrometers.

8. The liquid crystal display device of claim 1, wherein the liquid crystal mixture is formed from the liquid crystals, an ultraviolet curable monomer and an initiator for ultraviolet curing.

9. The liquid crystal display device of claim 8, wherein the liquid crystals are pretilted at an angle in a range from about 0.5 degree to about 3 degrees from a direction perpendicular to the first substrate when no driving power is applied to the first substrate and the second substrate.

10. The liquid crystal display device of claim 1, wherein each of the pixels comprises a single switching element.

11. The liquid crystal display device of claim 10, wherein only a single contact hole which interconnects the switching element and the pixel electrode is defined in each of the pixels.

12. A liquid crystal display device comprising:
a first substrate and a second substrate, which face each other and comprise a plurality of pixels;
a liquid crystal layer interposed between the first substrate and the second substrate and comprising a liquid crystal mixture; and
wherein the first substrate comprises a pixel electrode disposed in each of the pixels,
wherein the pixel electrode comprises:
a stem electrode extending in a first direction and a second direction intersecting the first direction to be disposed in a cross shape, wherein the stem electrode divides the pixel into first to fourth domains corresponding respectively to four quadrants;
a first domain branch electrode disposed in the first domain and forming an angle in a range from about 15 degrees to about 30 degrees with respect to the first direction and an angle in a range from about 60 degrees to about 75 degrees with respect to the second direction;
a second domain branch electrode disposed in the second domain and forming an angle in a range from about 60 degrees to about 75 degrees with respect to the first direction and an angle in a range from about 15 degrees to about 30 degrees with respect to the second direction;
a third domain branch electrode disposed in the third domain and forming an angle in a range in a range from about 15 degrees to about 30 degrees with respect to the first direction and an angle in a range from about 60 degrees to about 75 degrees with respect to the second direction; and
a fourth domain branch electrode disposed in the fourth domain and forming an angle in a range from about 60 degrees to about 75 degrees with respect to the first direction and an angle in a range from about 15 degrees to about 30 degrees with respect to the second direction,
wherein the liquid crystal mixture comprises liquid crystals, and a dopant which adjusts a pitch of the liquid crystals, and
wherein a product of dielectric anisotropy of the liquid crystal mixture and the cell gap has a value in a range from about 390 nanometers to about 500 nanometers.

13. The liquid crystal display device of claim 12, wherein a sum of an angle formed between each of the domain branch electrodes and the first direction and an angle formed between each of the domain branch electrodes and the second direction is about 90 degrees.

14. The liquid crystal display device of claim 12, wherein the dopant is a chiral dopant.

15. The liquid crystal display device of claim 12, wherein a ratio of a cell gap, which is a distance of a gap between the first substrate and the second substrate, to the pitch of the liquid crystal mixture has a value in a range from about 0.25 to about 0.33.

16. The liquid crystal display device of claim 12, wherein the dielectric anisotropy of the liquid crystal mixture has a value in a range from about 0.13 to about 0.166.

17. The liquid crystal display device of claim 12, wherein the cell gap has a value in a range from about 2.8 micrometers to about 3.2 micrometers.

18. The liquid crystal display device of claim 12, wherein the liquid crystal mixture is formed from the liquid crystals, an ultraviolet curable monomer, and an initiator for ultraviolet curing, and
the liquid crystals are pretilted at an angle in a range from 0.5 degree to about 3 degrees from a direction perpendicular to the first substrate when no driving power is applied to the first substrate and the second substrate.

* * * * *